United States Patent [19]

Motter

[11] 4,220,299
[45] Sep. 2, 1980

[54] AIRFOIL SUIT

[76] Inventor: William G. Motter, 867 Ahua St., Honolulu, Hi. 96819

[21] Appl. No.: 15,542

[22] Filed: Feb. 26, 1979

Related U.S. Application Data

[63] Continuation of Ser. No. 831,336, Sep. 7, 1977, abandoned.

[51] Int. Cl.$^2$ ............................................. B64D 17/00
[52] U.S. Cl. ................................... 244/143; 2/2.1 A; 2/84; 2/250; 280/810
[58] Field of Search .................. 244/143, 142, 138 R; 280/11.37 S; D2/29, 36; 2/247, 84, 79, 243 A, 51, 80, 82, 88, 126, 232, 250, 2.1 R, 2.1 A; 9/307, 308, 331, 311

[56] References Cited

U.S. PATENT DOCUMENTS

| | | | |
|---|---|---|---|
| 1,110,710 | 9/1914 | Ogilvie | 244/143 |
| 1,120,165 | 12/1914 | Slawinska | 244/143 |
| 1,178,165 | 4/1916 | Lupton | 280/11.37 S |
| 1,257,049 | 2/1918 | Tathryn | 244/142 |
| 2,129,454 | 9/1938 | Wilkie | 2/84 |
| 2,682,056 | 6/1954 | Werber | 2/84 |
| 3,085,254 | 4/1963 | Cutler | 2/247 |
| 3,217,335 | 11/1965 | Bell | 2/247 X |
| 3,986,824 | 10/1976 | Waibel et al. | 2/79 X |
| 4,038,698 | 8/1977 | Smith | 2/84 |

FOREIGN PATENT DOCUMENTS 823884  1/1938  France .................................... 244/143

Primary Examiner—Barry L. Kelmachter
Attorney, Agent, or Firm—James Creighton Wray

[57] ABSTRACT

A pair of pocketed, triangular shaped wings are stored in two zipper closed longitudinal pockets in the one piece body of a polyester ski suit. The wings are permanently connected to the sides of the suit and are attached by zippers to the lower edges of the arms of the suit. The outer edges of the wings are elastic. The suit has an optional head covering.

11 Claims, 3 Drawing Figures

AIRFOIL SUIT

This is a continuation of application Ser. No. 831,336, filed Sept. 7, 1977, now abandoned.

BACKGROUND OF THE INVENTION

1. Field of the Invention

This invention relates generally to aeronautical apparatus and more particularly has reference to a safety lowering device attached to a garment.

2. Description of the Prior Art

Pertinent United States and foreign patents are found in class 2, subclasses 51, 79, 80, 81, 82, 88, 126, 232, 247, 250 and class 244, subclasses 138, 142, 143, 153 and 155, of the official classifications of patents in the United States Patent and Trademark Office.

Examples of pertinent patents are U.S. Pat. Nos.
1,143,834
1,120,165
1,757,854
1,771,727
3,742,518
3,964,697
3,969,772

U.S. Pat. No. 1,757,854 shows a suit for a parachutist which has webs between the arms and an upper portion of the suit. The webs are merely lateral extensions of a longitudinal tubular section of a balloon. The webs are not connected to the jacket portion of the garment.

U.S. Pat. No. 1,771,727 shows a suit for parachuting which has large vanes attached to legs and extending above arms. The suit is inflated to envelope the user.

U.S. Pat. No. 3,964,697 shows strap-on wings for a sky diver.

U.S. Pat. No. 3,969,772 describes drag increasing means with openings in a suit for trapping air in a free fall.

U.S. Pat. No. 3,742,518 shows a jump suit with outer and inner sleeves. The outer sleeves and pant legs flare and increase drag.

U.S. Pat. No. 2,465,286 describes a jacket overall with zippers at the front of armholes so that one can extend arms through the armholes.

U.S. Pat. Nos. 1,143,835 and 1,120,165 are of general interest.

No prior art device has a web or a vane connected to a suit. No prior art device has a suit with zippered pockets from which attached vanes unfold.

SUMMARY OF THE INVENTION

The present invention provides a tight fitting suit having a body portion which covers the trunk, arms and legs of a person. Preferably the body is one piece. The suit includes an optional helmet portion which covers the head. One enters the suit through a frontal zipper which extends from the facial or neck opening down to a lower part of the trunk.

There are two longitudinal pockets which extend from beneath the arms downward to substantially a knee area of the leg on each side of the suit. Opening these zipper closed pockets releases wings which have side edges permanently attached to the side of the suit between an area beneath the arm and substantially to the knees. Upper edges of the wings are then attached with a zipper, having halves fixed to the upper wing edges and to lower edges of the arms. Each triangular wing is pocketed so that it may balloon upward and rearward in use. The outer edge of the triangular wing is elastic, so that the wing may be stretched by raising the arms upward to vary aerodynamic performance. Unzipping the wings from the arms allow the wings to be folded and stored within the longitudinal suit pockets, whereupon the zipper on the pockets is closed, storing the wing and resulting in a suit which looks similar to a close fitting ski suit.

One object of the invention is to provide an improved air foil suit.

Another object of the invention is to provide an air foil suit having a body covering with torso portions and arm portions and wings having inward ends connected to the torso portions and having upward ends connected to the arm portions.

Still another object of the invention is to provide an air foil suit wherein the upward ends of the wings are removably connected to the arm portions.

A further object of the invention is to provide an airfoil suit having longitudinally extending pockets positioned to receive the wings when the wings are removed from the arm portions.

These and other and further objects and features of the invention are apparent in the disclosure which includes the above and below specifications and claims and drawings.

DETAILED DESCRIPTION OF THE DRAWINGS

Figure 1:
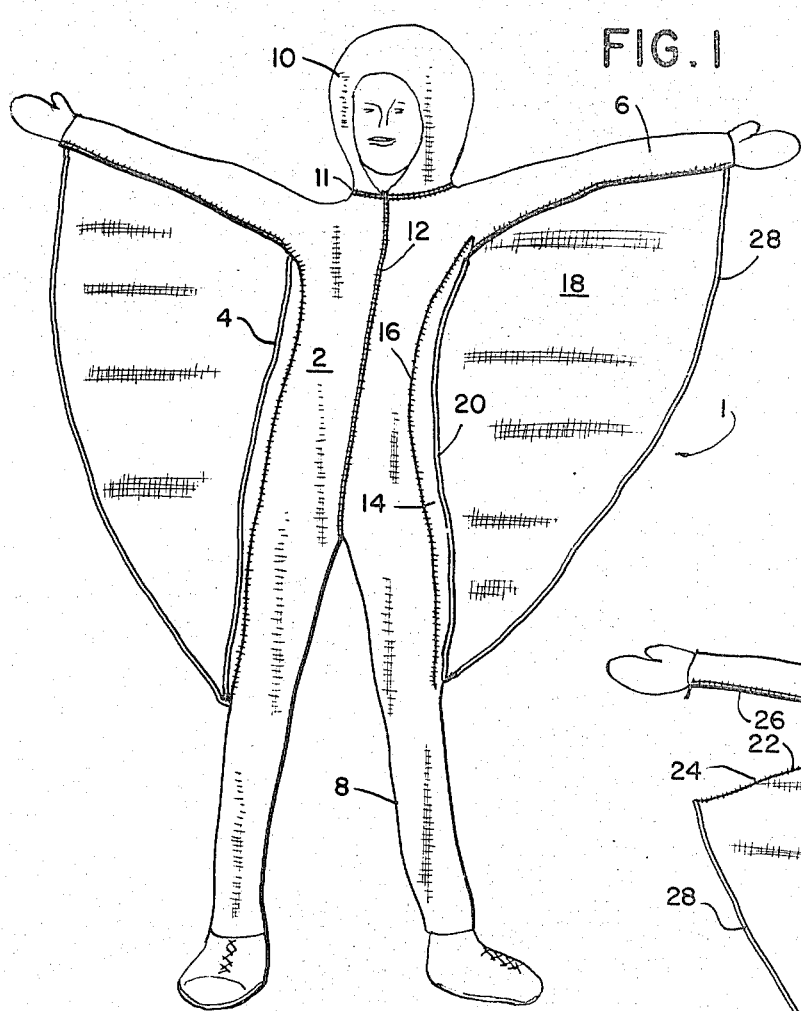
FIG. 1 is an elevational view showing a person outfitted with the suit of the present invention.
Figure 3:
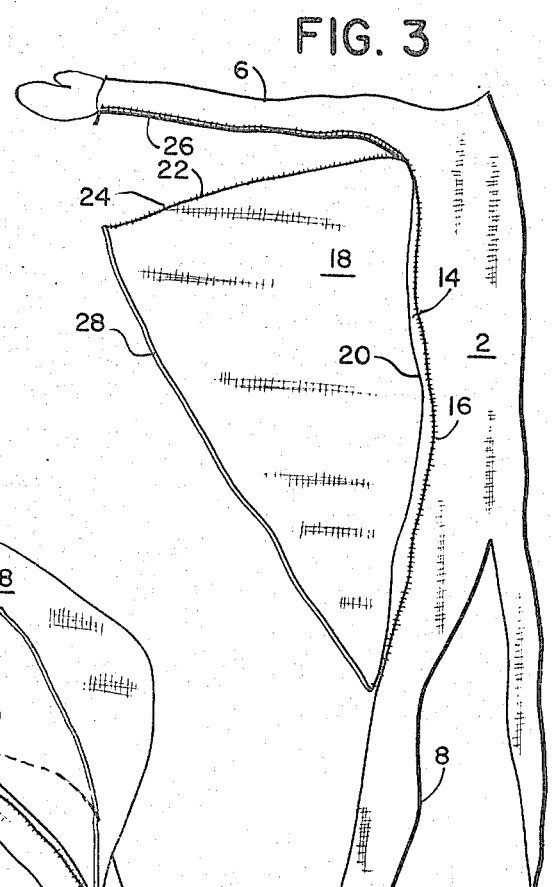
FIG. 3 is a detailed elevational view of one wing of the suit detached from the arm.

An air foil ski suit 1, made in accordance with the present invention, is shown in FIG. 1.

The body 2 of the suit 1 is generally a coverall type garment. The body 2 is designed to cover the torso, arms and legs of the skier. For best performance, the arms 6 should extend outwardly to the wrists and the legs 8 should extend downwardly to the ankles. Preferably, the body 2 of the suit 1 is one piece.

An optional head covering helmet 10 is provided. In one embodiment, the helmet 10 is detachably connected to the body 2 of the suit 1 by a zipper 11. In an alternative embodiment, the helmet 10 is permanently attached to the body 2 of the suit 1 adjacent a zipper closed pocket or collar. The helmet 10 is designed to be rolled up and stored in the pocket or collar.

The body 2 fits the skier snugly to avoid undesired wind resistance. Suits 1 made of polyester fabric have proved most successful in reducing wind resistance to a minimum. Use of the optional helmet 10 with the body 2 of the suit 1 reduces wind resistance.

A zipper 12 extends down the front of the body 2 from the neck opening to a lower part of the torso 4. The zipper 12 provides the skier with convenient means to enter the suit.

Longitudinal pockets 14 which extend from beneath the arms 6 downward to substantially a knee area of the leg 8 are provided on each side of the body 2. Preferably, the pockets 14 are aligned with the arms 6. It is understood, however, that various other pocket orientations can be used to achieve desired special effects.

The edges of the pockets 14 are provided with zippers 16 to selectively open and close the pockets 14.

Wings 18 are connected to the body 2. Preferably, the wings 18 have side edges 20 permanently attached to the sides of the body 2 between an area beneath the arm 6 and substantially to the knees. The side edge 20 is aligned with the pocket 14. If desired, the side edge 20 of the wing 18 may be connected to the body 2 at a location in the interior of the pocket 14.

The pocket 14 is sufficiently large to accomodate the wings 18 when the wings 18 are properly folded. When the wings 18 are folded and stored within the pockets 14 and the zipper 16 on the pockets 14 is closed, the suit 1 closely resembles a conventional ski suit.

Opening the zippers 16 releases the wings 18 stored in the pockets 14. The upper edges 22 of the wings 18 are provided with zipper teeth 24. The teeth 24 are configured to matingly engage zipper teeth 26 connected to the lower edge of the arms 6. A zipper slide is connected to the teeth 24 and 26 for moving the teeth 24 and 26 into engagement and thereby connecting the upper edge 22 of the wing 18 to the arm 6 of the body 2.

In preferred form, the wing 18 has a generally triangular shape. The outer edge 28 of the wing 18 is elastic so that the wing may be stretched by raising the arms 6 upward when the wings 18 are connected to the arms 6. The elastic also facilitates storage of the wings 18 by urging the outer portions of the wing 18 toward the pocket 14.

Figure 2:
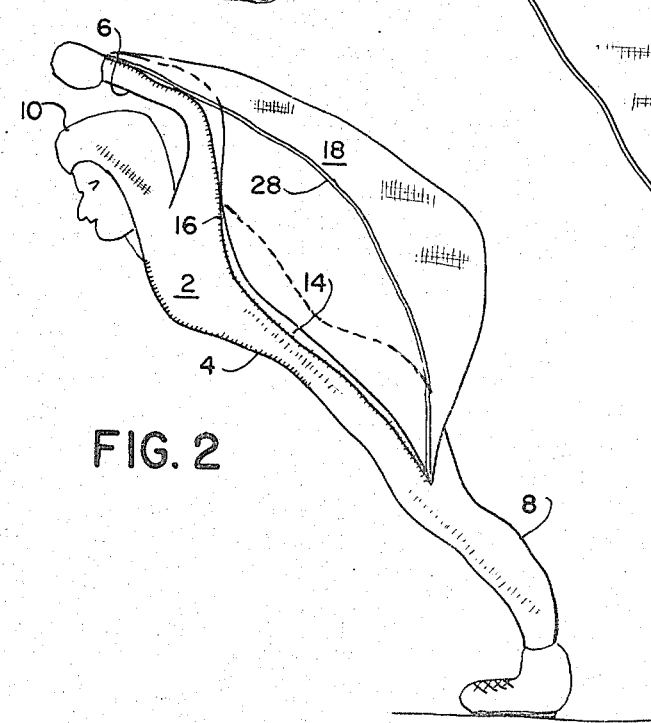
FIG. 2 is a side elevational view of the present invention in use.

As shown in FIG. 2, the wings 18 are pocketed so they balloon upward and rearward when deployed in use. It is understood, that various wing shapes and configurations can be used to vary aerodynamic performance. For example, the wing 18 may be designed to terminate downwardly at the skier's waist. Also, the edges 20 and 22 of the wing 18 may be connected to the body 2 in a discontinuous manner to permit air flow between the wing 18 and the body 2.

A few of the many and varied uses of the suit 1 can now be appreciated. With the wing 18 unzipped from the arm 6 and stored in the pockets 14, the skier is provided with a suit which looks closely similar to the familiar ski suit. Opening the zipper closed pockets 14 releases the wings 18. The upper edges 22 of the wings 18 are then zipped to the arms 6, thereby deploying the wings in the proper aerodynamic position. By raising and lowering his arms 6, the skier can control his rate of descent down the hill. By raisig his arms when airborne after crossing a mogul, the skier can sustain brief flight and touch down gracefully.

While the invention has been described with reference to a specific embodiment, the exact nature and scope of the invention is defined in the following claims:

I claim:

1. Airfoil suit apparatus comprising
a one piece body covering having torso portions arm portions, and leg portions, and two longitudinal wing-storing pockets extending downward along sides of the torso portions and midway down the leg portions, the wing-storing pockets having cooperating closures for opening and closing the pockets,
wings having inward edges permanently connected to the torso portions between the closures and the wings having upward edges removably connected to the arm portions, whereby the wings only extend to a point midway down the leg portions and whereby the wings may be released from the pockets and connected to the arm portions for use and may be disconnected from the arm portions, folded and stored within the longitudinal pockets leaving a suit with close-fitting appearance.

2. The apparatus of claim 1 wherein
the inward edges are connected to opposite sides of the torso portions in substantial alignment with the arm portions.

3. The apparatus of claim 1 wherein
the one piece body covering has head covering portions.

4. The apparatus of claim 1 wherein
the body covering is adapted to fit snugly on a human body.

5. The apparatus of claim 1 wherein
the wings have a generally triangular shape.

6. The apparatus of claim 1 wherein
said inward edges extend from beneath the arm portions downward to the lower ends of the torso portions and said upward edges extend from the sides of the torso portions outward to the outward ends of the arm portions, the inward edges continuously connected to the torso portions and the upward edges continuously removably connected to the arm portions.

7. The apparatus of claim 1 wherein
the upward edges are provided with zipper teeth,
the arm portions are provided with zipper teeth configured to matingly engage the zipper teeth on the upward edges, wherein the zipper teeth releasably disengages the wings from the arm portions, and
further comprising a zipper slide connected to the zipper teeth for moving the zipper teeth into engagement.

8. The apparatus of claim 1 wherein
the wings further have outward ends releasably engaged to the arm portions and permanently engaged to the torso portions,
the outward ends provided with elastic material configured to stretch as the arm portions are moved outwardly from the torso portions.

9. The apparatus of claim 1 wherein said cooperating closures comprise zipper closures adjacent openings for the longitudinal wing-storing jacket pockets for selectively closing the pocket openings.

10. The apparatus of claim 1 wherein
said inward edges extend from beneath the arms downward to above the knees and said upward edges extend from the sides of the torso portions outward to the outward ends of the arm portions.

11. The apparatus of claim 1 wherein
the body covering further has detachable head covering portions.

* * * * *